United States Patent [19]

Konno

[11] Patent Number: 4,777,914

[45] Date of Patent: Oct. 18, 1988

[54] VALVE OPERATING APPARATUS FOR AN INTERNAL COMBUSTION ENGINE

[75] Inventor: Tsuneo Konno, Saitama, Japan

[73] Assignee: Honda Giken Kogyo Kabushiki Kaisha, Tokyo, Japan

[21] Appl. No.: 89,972

[22] Filed: Aug. 27, 1987

[30] Foreign Application Priority Data

Aug. 27, 1986 [JP] Japan ............................. 61-200955
Oct. 13, 1986 [JP] Japan ............................. 61-242676

[51] Int. Cl.$^4$ ............................. F01L 1/34; F01L 1/26
[52] U.S. Cl. ............................. 123/90.4; 123/90.16; 123/90.17
[58] Field of Search ............ 123/90.4, 90.16, 90.17, 123/90.44

[56] References Cited

U.S. PATENT DOCUMENTS

| | | | |
|---|---|---|---|
| 4,523,550 | 6/1985 | Matsuura | 123/90.16 |
| 4,537,164 | 8/1985 | Ajiki et al. | 123/90.16 |
| 4,537,165 | 8/1985 | Honda et al. | 123/90.16 |
| 4,545,342 | 10/1985 | Nakano et al. | 123/90.16 |
| 4,556,025 | 12/1985 | Morita | 123/90.16 |
| 4,589,387 | 5/1986 | Miura et al. | 123/90.16 |
| 4,612,884 | 9/1986 | Ajiki et al. | 123/90.16 |
| 4,627,391 | 12/1986 | Derrringer | 123/90.16 |
| 4,656,977 | 4/1987 | Nagahiro et al. | 123/90.16 |
| 4,690,110 | 9/1987 | Nishimura et al. | 123/90.17 |
| 4,726,332 | 2/1988 | Nishimura et al. | 123/90.16 |

Primary Examiner—Raymond A. Nelli
Attorney, Agent, or Firm—Lyon & Lyon

[57] ABSTRACT

Valve operating apparatus is disclosed in which the valves are operated by rocker arms driven by cams having different cam profiles and hydraulically operated coupling mechanisms for selectively connecting or disconnecting adjacent rocker arms to vary the operation of the valves under different engine operating conditions. The coupling mechanisms are operated by fluid supplied through the rocker shaft mounting the rocker arms. The rocker shaft is divided into independent fluid supply passages whereby the couplings can be suppplied independently with operating fluid in order to expand the number of available valve operating control modes. Variations are described in which operating fluid can be independently supplied to various ancillary hydraulically-operated equipment, as well as to the selective coupling mechanisms.

15 Claims, 8 Drawing Sheets

VALVE OPERATING APPARATUS FOR AN INTERNAL COMBUSTION ENGINE

BACKGROUND OF THE INVENTION

The present invention relates to valve operating apparatus for an internal combustion engine. More particularly, the invention involves valve operating apparatus of the type including a camshaft rotatably driven by the engine, a plurality of cams on the camshaft for operating the intake or exhaust valves according to a selected mode of operation, and pivotably mounted rocker arms for opening and closing the valves in response to rotation of the cams.

In valve operating devices of the type described, driver rocker arms operably connected to the valve or valves to be operated, and free rocker arms, independent of the valves, are disposed adjacent each other and are operable in different modes by rotation of the cams. A selective coupling carried by the rocker arms are hydraulically actuable for selectively interconnecting or disconnecting the respective rocker arms according to the desired mode of valve operation.

In such valve operating device, it is general practice to select relative valve diameters, valve timings, and valve lifts in view of a high-speed range for higher engine output power. However, if an intake valve is actuated at constant valve timing and valve lift throughout a full engine speed range from low to high speeds, then the speed of flow of an air-fuel mixture into the combustion chamber varies from engine speed to engine speed since the amount of air-fuel mixture introduced per unit time varies from engine speed to engine speed. At low engine speeds, the speed of flow of the air-fuel mixture is lowered, the charging efficiency is lowered, and the air-fuel mixture is not mixed and atomized appropriately in the combustion chamber, resulting in slow combustion therein. Therefore, no stable combustion is achieved, and the engine speed becomes irregular during the low-speed operation. Consequently, the combustion efficiency, the fuel economy, and the knocking margin lowered are all reduced.

One solution to the above problem is suggested in Japanese Laid-Open Patent Publication No. 59-226216. According to that solution, some of the intake and/or exhaust valves remain closed when the engine operates at a low speed, whereas all of the intake and exhaust valves are operated, i.e., alternately opened and closed, during high-speed operation of the engine. Controlling the valves differently in low- and high-speed ranges, as suggested by this reference, is not totally dispositive of the problem, however. For example, if the valve control were effected in different modes in more speed ranges, the engine output power would be increased, stable low-speed operation would become possible, and the fuel economy would be improved.

In the above-referred prior art valve operating device, moreover, hydraulic passages for supplying hydraulic pressure respectively to the selective coupling means are defined by dividing the inner space of the rocker shaft by means of a steel ball that is forcibly inserted into and securely positioned in the rocker shaft. With such a structure, the hydraulic pressure must be supplied from the axially opposite sides of the rocker shaft, and hence the hydraulic pressure supply circuit for the valve operating device for use in a multicylinder internal combustion engine becomes complex.

It is to the amelioration of these problems, therefore, that the present invention is directed.

SUMMARY OF THE INVENTION

According to the present invention, there is provided a valve operating device for an internal combustion engine in which valves are controlled in a multitude of speed ranges by a simplified hydraulic pressure supply circuit. The invention contemplates selectively actuable coupling means disposed between adjacent ones of the rocker arms for interconnecting and disconnecting the rocker arms. According to one particularly beneficial embodiment, the valve operating device employs a camshaft having three adjacent cams. Three pivotally mounted rocker arms are held in sliding contact with the respective cams, one of the rocker arms being a free rocker arm and the other two being driver rocker arms operably connected to the intake or exhaust valves for opening and closing them. The selective coupling means between adjacent rocker arms are each independently supplied with operating fluid so that a greater number of engine speed ranges can be controlled.

To accomplish this, the rocker shaft is divided by axially extending partitions into a plurality of hydraulic pressure supply passages for separate communication with the respective coupling means.

By separately and selective actuating the respective coupling means in accordance with the operating conditions of the engine, the rocker arms can be operated in different modes, and the valves can be controlled in a large number of speed ranges. The required hydraulic pressure control circuit is simplified because the hydraulic supply passages defined in the rocker shaft by the axially extending partitions communicate separately with the respective coupling means.

Moreover, as a result of the provision of separate, independent hydraulic pressure supply passages, the supply of operating fluid for other than selective coupling operation can readily be accommodated. In this regard, the present invention also contemplates, in related embodiments, the independent supply of operating fluid; for example, to hydraulic lash adjusters employed between the rocker arm and the associated valve. In addition, fluid, such as oil, for lubricating various parts of the apparatus can also be provided.

For a better understanding of the invention, its operating advantages and the specific objectives obtained by its use, reference should be made to the accompanying drawings and description which relate to a preferred embodiment thereof.

DESCRIPTION OF THE PREFERRED EMBODIMENTS OF THE INVENTION

Figure 1:
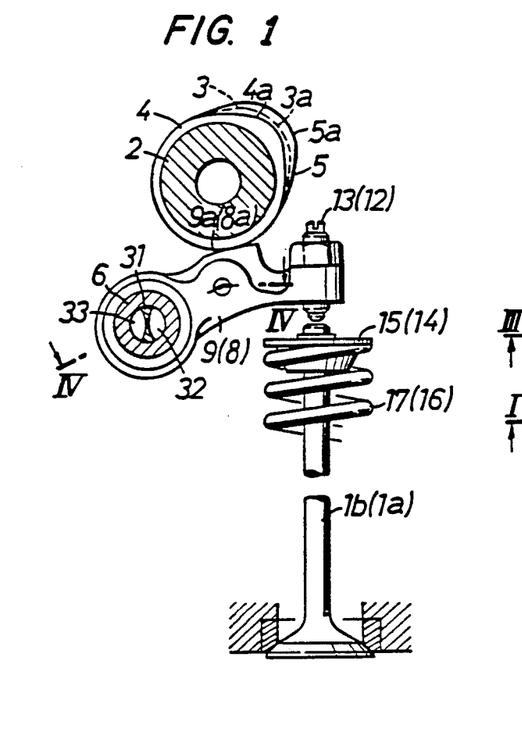
FIG. 1 is an elevational view of valve operating apparatus according to the present invention taken along line I—I of FIG. 2.
Figure 2:
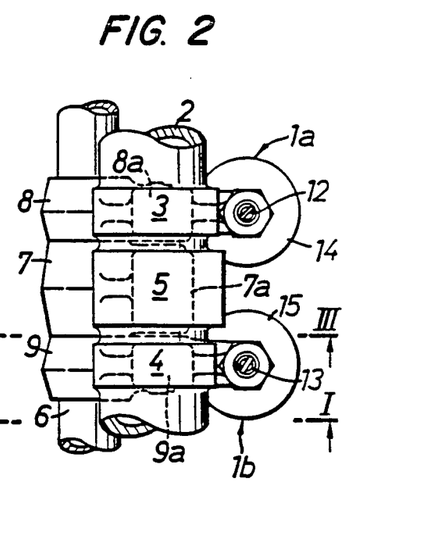
FIG. 2 is a plan view of the valve operating apparatus of FIG. 1.

In FIGS. 1 and 2, which show a first embodiment of the present invention, a pair of intake valves $1a$, $1b$ are disposed in the body of an internal combustion engine. The valves $1a$, $1b$ can be opened and closed by a first low-speed cam 3, a second low-speed cam 4, and a high-speed cam 5 which are integrally formed on a camshaft 2 rotatable in synchronism with rotation of the engine at a speed ratio of $\frac{1}{2}$ with respect to the speed of rotation of the engine. The cams 3, 4, 5 operate first, second and third rocker arms 7, 8, 9 pivotally supported on a rocker shaft 6 extending parallel to the camshaft 2.

The camshaft 2 is rotatably disposed above the engine body. The high-speed cam 5 is integrally formed on the camshaft 2 in alignment with an intermediate position between the intake valves $1a$, $1b$. The first low-speed cam 3 has a cam profile to meet low-speed operation of the engine and includes a cam lobe $3a$ projecting radially outwardly to a relatively small extent. The high-speed cam 5 has a cam profile to meet high-speed operation of the engine and includes a cam lobe $5a$ projecting radially outwardly to a greater extent than the cam lobe $3a$, the cam lobe $5a$ also having a larger angular extent than the cam lobe $3a$. The second low-speed cam 4 also has a cam profile to meet the low-speed operation of the engine and includes a cam lobe $4a$ projecting radially outwardly to a relatively small extent, the cam lobe $4a$ being smaller than the cam lobe $3a$.

The rocker shaft 6 is fixed below the camshaft 2. The first through third rocker arms, 7 through 9, which are operated respectively by the high-speed cam 5, the first low-speed cam 3, and the second low-speed cam 4, are pivotally supported on the rocker shaft 6. The rocker arms 7, 8, 9, have on their upper portions cam slippers $7a$, $8a$, $9a$, held in sliding contact with the cams, 3, 4, 5, respectively. The second and third rocker arms, 8, 9, extend to positions above the intake valves $1a$, $1b$. Tappet screws 12, 13 are threaded through distal ends of the second and third rocker arms 8, 9 and are engageable with the upper ends of the intake valves $1a$, $1b$.

Flanges 14, 15 are attached to the upper ends of the intake valves $1a$, $1b$. The intake valves $1a$, $1b$ are normally urged upward, i.e., in a closing direction, by compression coil springs 16, 17 disposed on the intake valves $1a$, $1b$ between the flanges 14, 15 and the engine body.

Figure 3:
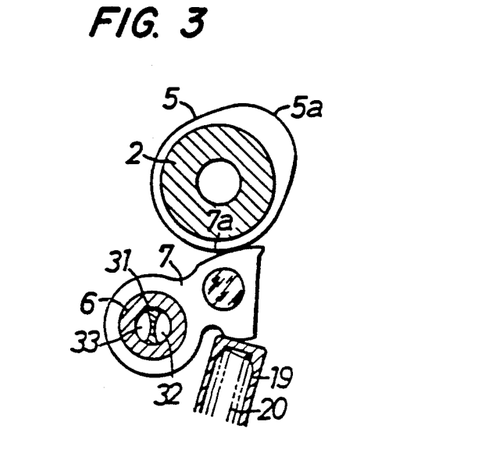
FIG. 3 is a sectional view taken along line III—III of FIG. 1.

As shown in FIG. 3, a cylindrical lifter 19 having a closed upper end is disposed as a pushing means in abutment against a lower surface of the end of the first rocker arm 7. The lifter 19 is normally urged upwardly by a lifter spring 20 of relatively weak resiliency interposed between the lifter 19 and the engine body (not shown) for resiliently biasing the cam slipper $7a$ of the first rocker arm 7 slidably against the high-speed cam 5.

Figure 4:
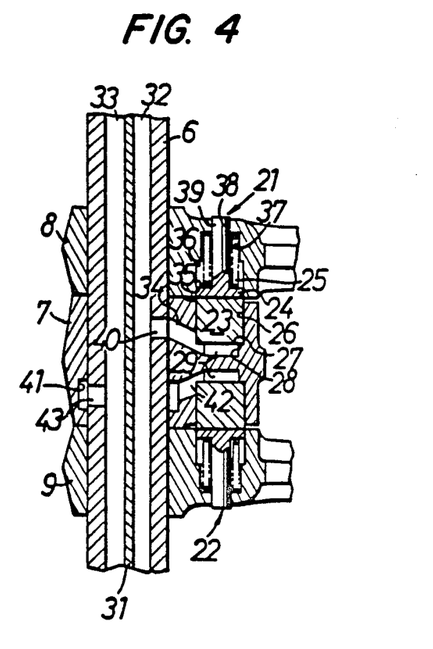
FIGS. 4, 5 and 6 are sectional views taken along line IV—IV of FIG. 1 illustrating the selective coupling means in various operating conditions.

As illustrated in FIG. 4, the first and second rocker arms 7, 8 are disposed in laterally adjacent sliding contact with each other. A first selectively actuated coupling 21 is operatively disposed between the first and second rocker arms 7, 8 for selectively disconnecting the rocker arms 7, 8 from each other for relative angular displacement and also for interconnecting the rocker arms 7, 8 for their movement in unison. Likewise, the first and third rocker arms 7, 9 are disposed in laterally adjacent sliding contact with each other. A second selectively actuated coupling 22 is operatively disposed between the first and third rocker arms 7, 9 for selectively disconnecting the rocker arms 7, 9 from each other for relative angular displacement and also for interconnecting the rocker arms 7, 9 for their movement in unison.

The first and second selectively actuated couplings 21, 22 are of an identical construction, and hence only the first coupling 21 will hereinafter be described in detail. The first coupling 21 comprises a piston 23 movable between a position in which it interconnects the first and second rocker arms 7, 8 and a position in which it disconnects the first and second rocker arms 7, 8 from each other. Also provided are a stopper 24 for limiting the movement of the piston 23, and a spring 25 for urging the stopper 24 to move the piston 23 toward the position to disconnect the first and second rocker arms 7 and 8 from each other.

The first rocker arm 7 has a first guide hole 26 opening toward the second rocker arm 8 and extending parallel to the rocker shaft 6. The first rocker arm 7 also has a smaller-diameter hole 28 near the closed end of the first guide hole 26 with a step 27 being defined between the smaller-diameter hole 28 and the first guide hole 26. The piston 23 is slidably fitted in the first guide hole 26. The piston 23 and the closed end of the smaller-diameter hole 28 cooperate to define therebetween a hydraulic pressure chamber 29.

The second rocker arm 8 has a second guide hole 35 opening toward the first rocker arm 7 for registration with the first guide hole 26 in the first rocker arm 7. The circular stopper 24 is slidably fitted in the second guide hole 35. The second rocker arm 8 also has a smaller-diameter hole 37 near the closed end of the second guide hole 35 with a step 36 defined between the second guide hole 35 and the smaller-diameter hole 37 for limiting movement of the circular stopper 24. The second rocker arm 8 also has a through-hole 38 defined coaxially with the smaller-diameter hole 37. A guide rod 39 joined integrally and coaxially to the circular stopper 24 extends through the hole 38. A coil spring 25 is disposed around the guide rod 39 between the stopper 24 and the closed end of the smaller-diameter hole 37.

The piston 23 has an axial length selected such that, when one end of the piston 23 abuts against the step 27, the other end thereof is positioned at the interface between the first and second rocker arms 7, 8, and, when the piston 23 is moved into the second guide hole 35 until it displaces the stopper 24 into abutment against the step 36, the said one end of the piston 23 remains in the first guide hole 26.

The rocker shaft 6 has an axially extending partition 31 forced or fixedly mounted therein or it may be integrally formed therewith. The partition 31 divides the inner space of the rocker shaft 6 into two longitudinally parallel, hydraulic pressure supply passages 32, 33.

The first rocker arm 7 has adjacent one end a hydraulic passage 34 defined therein in communication with the hydraulic pressure chamber 29 of the first coupling 21. The rocker shaft 6 has a hole 40 defined therein and providing communication between the hydraulic passage 34 and the hydraulic passage supply passage 32 irrespective of how the first rocker arm 7 is angularly moved about the rocker shaft 6. The first rocker arm 7 has adjacent to its other end an annular groove 41 surrounding the rocker shaft 6 and a hydraulic passage 42 through which the annular groove 41 communicates with the hydraulic pressure chamber 29 of the second coupling 22. The rocker shaft 6 has a hole 43 providing communication between the hydraulic pressure supply passage 33 and the annular groove 41. Therefore, the hydraulic pressure chamber 29 of the first coupling 21 communicates with the hydraulic pressure supply passage 32, and the hydraulic pressure chamber 29 of the second coupling 22 communicates with the hydraulic pressure supply passage 33. The first and second couplings 21, 22 can thus be operated independently of each other.

Operation of the valve operating mechanism is as follows. When the engine is to operate in a low-speed range, the first and second couplings 21, 22 are actuated to disconnect the first through third rocker arms 7, 8, 9 from each other as illustrated in FIG. 4. More specfically, hydraulic pressure is released from the hydraulic pressure chamber 29, thus allowing the stopper 24 to move toward the first rocker arm 7 under the resiliency of the spring 25 until the piston 23 abuts against the step 27. In this condition, the mutually contacting ends of the piston 23 and the stopper 24 of the first coupling 21 are aligned with the adjacent, mutually sliding side walls of the first and second rocker arms 7, 8, and the mutually contacting ends of the piston 23 and the stopper 24 of the second coupling 22 are aligned with the adjacent, mutually sliding side walls of the first and third rocker arms 7, 9. Thus, the first, second, and third rocker arms, 7, 8, 9 are held in mutually side-by-side sliding contact for relative angular movement.

With the first through third rocker arms 7, 8, 9 being thus disconnected, the second and third rocker arms, 8, 9 are not affected by the angular movement of the first rocker arm 7. The second rocker arm 8 is angularly moved in sliding contact with the first low-speed cam 4, whereas the third rocker arm 9 is angularly moved in sliding contact with the second low-speed cam 5. Therefore, the intake valve 1a is alternately opened and closed by the second rocker arm 8, and the other intake valve 1b is alternately opened and closed by the third rocker arm 9. Any frictional loss of the valve operating mechanism is relatively low because the first rocker arm 7 is held in sliding contact with the high-speed cam 5 under the relatively small resilient force of the lifter spring 20.

During low-speed operation of the engine, therefore, the intake valve 1a is alternately opened and closed at the valve timing and valve lift according to the profile of the first low-speed cam 3, whereas the other intake valve 1b is alternately opened and closed at the valve timing and valve lift according to the profile of the second low-speed cam 4. Accordingly, the air-fuel mixture flows into the combustion chamber at a rate suitable for the low-speed operation of the engine, thereby resulting in stable fuel combustion, improved fuel economy, stable low-speed operation, and prevention of knocking. Since the profiles of the low-speed cams 3, 4 are different, the turbulence of the air-fuel mixture in the combustion chamber is increased for improved fuel economy.

Figure 5:
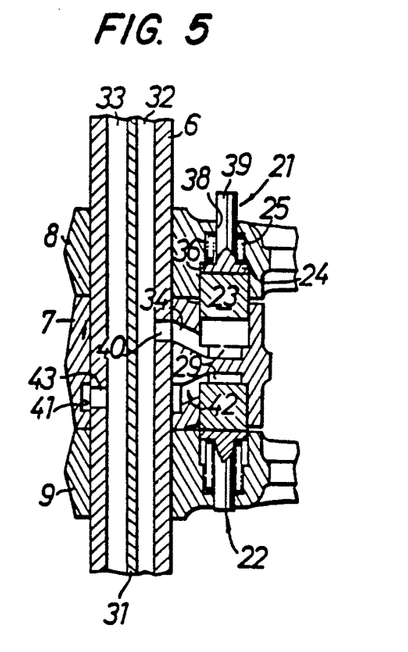

For medium-speed operation of the engine, the first and second rocker arms 7, 8 are interconnected by the first coupling 21, with the first and third rocker arms 7, 9 remaining disconnected from each other, as shown in FIG. 5. More specifically, the hydraulic pressure chamber 29 of the first coupling 21 is supplied with hydraulic pressure from the hydraulic pressure from the hydraulic pressure passage 32 to cause the piston 23 to push the stopper 24 into the second guide hole 35 against the resiliency of the spring 25 until the stopper 24 engages the step 36. The first and second rocker arms 7, 8 are now prevented from relative angular movement, but, instead, are caused to swing in unison.

Therefore, the intake valve 1a is alternatley opened and closed at the valve timing and valve lift according to the profile of the high-speed cam 5, whereas the other intake valve 1b is alternatley opened and closed at the valve timing ad valve lift according to the profile of the second low-speed cam 4. The air-fuel mixture now flows into the combustion chamber at a rate suitable for the medium-speed operation of the engine, resulting in a relatively high charging efficiency and greater turbulence of the air-fuel mixture in the combustion chamber and hence an improved fuel economy, as with the low-speed operation.

Figure 6:
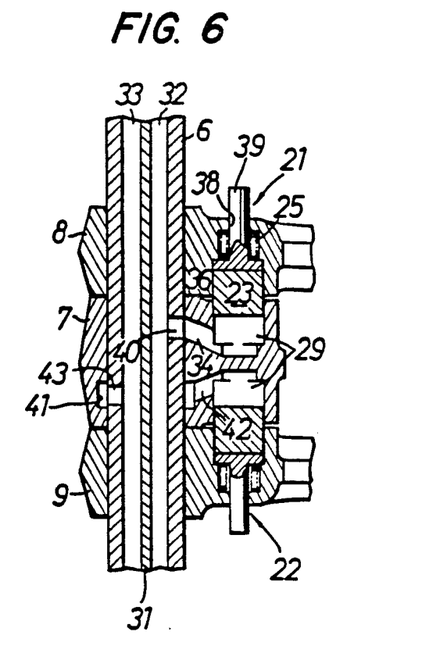

When the engine is to operate at a high speed, the first and third rocker arms 7, 9 are interconnected by the second coupling 22, as shown in FIG. 6, by supplying hydraulic pressure into the hydraulic pressure chamber 29 of the second coupling 22. Inasmuch as the first and second rocker arms 7, 8 remain connected by the first coupling 21 at this time, the rocker arms 7, 8, 9 are caused to swing by the high-speed cam 5. As a consequence, the intake valves 1a, 1b are alternately opened and closed at the valve timing and valve lift according to the profile of the high-speed cam 5. The charging efficiency is increased to enable the engine to produce high output power and torque.

The inner space of the rocker shaft 6 is divided into the hydraulic pressure supply passages 32, 33 by the axially extending partition 31, and the hydraulic pressure supply passages 32, 33, are held in communication with the hydraulic pressure chambers 29 of the respective first and second couplings 21, 22. Therefore, the hydraulic pressure can be supplied from one axial end of the rocker shaft 6, thereby making the hydraulic pressure supply circuit simple in a valve operating device in a multicylinder internal combustion engine.

As a modification of the first embodiment, the first and third rocker arms 7, 9 may be interconnected, while the first and second rocker arms 7, 8 are disconnected during the medium-speed operation of the engine. With such an arrangement, the intake valve 1a is alternately opened and closed at the valve timing and valve lift according to the profile of the first low-speed cam 3, whereas the other intake valve 1b is alternately opened and closed at the valve timing and valve lift according to the profile of the high-speed cam 5.

Figure 7:
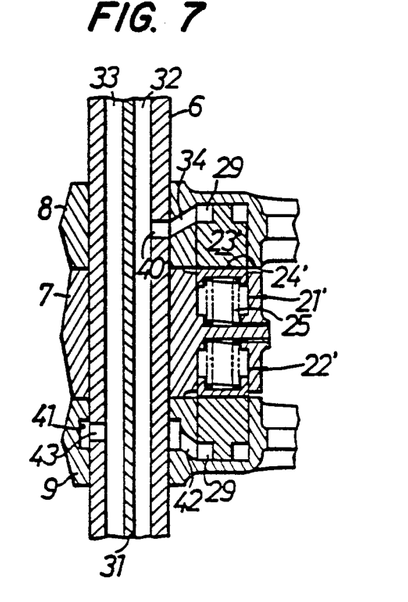
FIGS. 7 and 8 are sectional views similar to FIG. 4 illustrating additional embodiments of selective coupling means contemplated by the invention.

FIG. 7 shows a second embodiment of the present invention. In this embodiment a piston 23' is slidably disposed in each of the second and third rocker arms 8, 9, and stoppers 24' are slidably disposed in the first rocker arm 7 for urging stoppers 24 toward the pistons 23'. The second and third rocker arms 8, 9 have hydraulic passages 34, 42 providing communication between the hydraulic pressure supply passages 32, 33 and the hydraulic pressure chambers 29 of the selective couplings 21', 22'.

In addition to the advantages of the first embodiment, in this embodiment any malfunctions due to hydraulic pressure leakage can be prevented with the hydraulic pressure chambers 29 being provided in the second and third rocker arms 8, 9.

Figure 8:
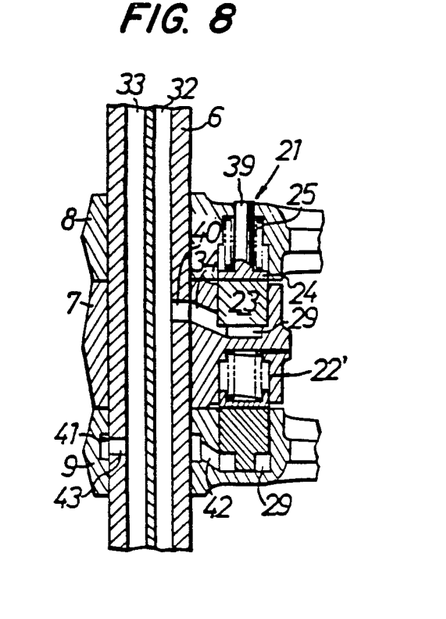

FIG. 8 illustrates a third embodiment in which the first coupling 21 is disposed between the first and second rocker arms 7, 8, and the second coupling 22' is disposed between the first and third rocker arms 7, 9. The third embodiment is as advantageous as the second embodiment.

Figure 9:
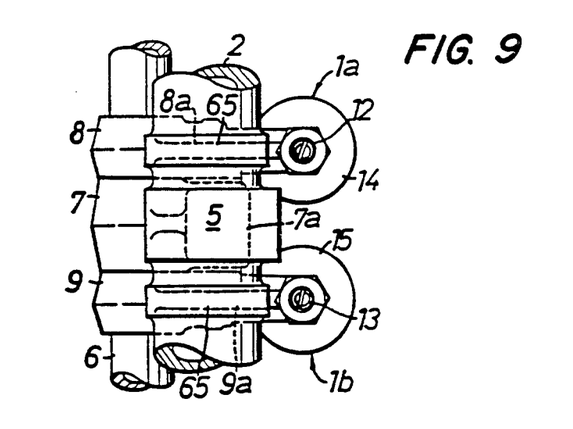
FIG. 9 is a plan view illustrating another cam arrangement contemplated for use in practice of the invention.

According to a fourth embodiment shown in FIG. 9, the first and second low-speed cams 3, 4 of the first embodiment are replaced with circular raised portions 64, 65 integrally formed on the camshaft 2.

The arrangement of FIG. 9 may be employed in combination with a certain cylinder of a multicylinder internal combustion engine. In a low-speed range, due to the presence of the circular raised portions 64, 65, both of the intake valves 1a, 1b are kept at rest, thereby disabling the cylinder for highly improved fuel economy. In a medium-speed range, only one of the intake valves 1a is operated to increase engine output power. In a high-seed range, both of the intake valves 1a, 1b are operated for higher engine output power.

Figure 10:
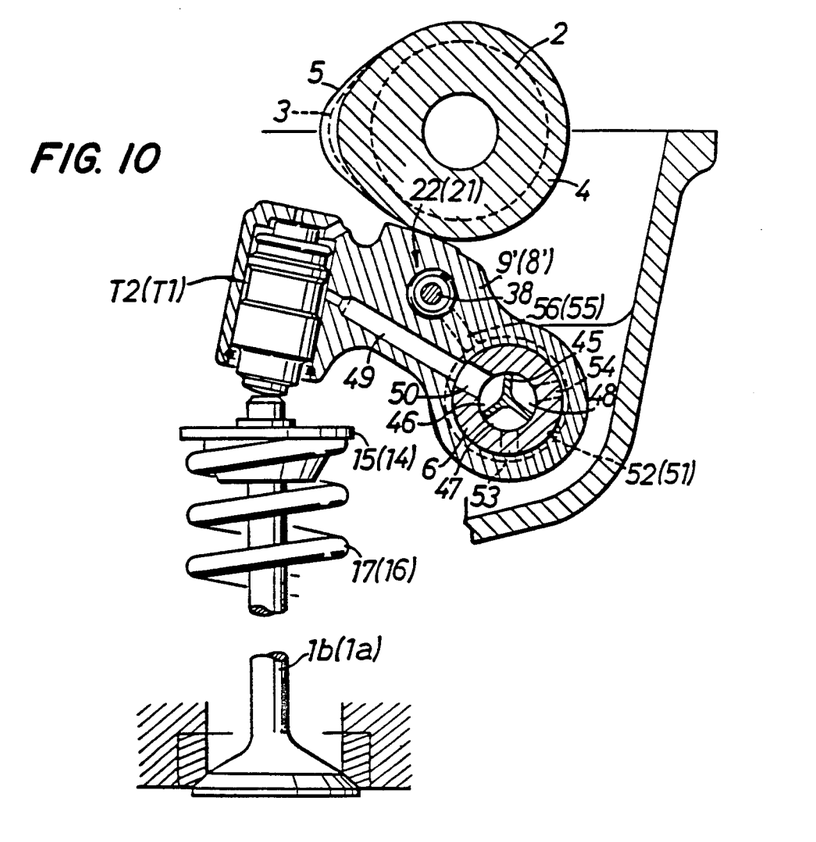
FIG. 10 is a sectional elevational view of the valve operating apparatus of the present invention in which a hydraulic adjuster is incorporated.

FIG. 10 illustrates a fifth embodiment of the present invention. In this embodiment, the second and third rocker arms 8', 9' are held against the intake valves 1a, 1b, respectively, through hydraulic tappets T1, T2. The rocker shaft 6 has therein an axially extending partition 45 of a Y-shaped cross section forced or fixedly mounted therein or integrally formed therewith. The partition 45 divides the inner space of the rocker shaft 6 into three parallel hydraulic pressure supply passages 46, 47, 48.

The second and third rocker arms 8', 9' have respective hydraulic passages 49 for supplying hydraulic pressure to the respective hydraulic tappets T1, T2. The rocker shaft 6 has a hole 50 defined therein for providing communication between the hydraulic passages 49 and the hydraulic pressure supply passages 46. A rocker arm (not shown) disposed between the second and third rocker arms 8', 9' has annular grooves 51, 52 surrounding the rocker shaft 6 in a position corresponding to the couplings 21, 22 and also has hydraulic passages 55, 56 through which the hydraulic pressure chambers of the couplings 21, 22 communicate respectively with the annular grooves 51, 52. The rocker shaft 6 also has a hole 53 communicating between the hydraulic pressure supply passage 47 and the annular groove 51 and a hole 54 communicating between the hydraulic pressure supply passage 48 and the annular groove 52.

According to the fifth embodiment, each of the hydraulic tappets T1, T2, the coupling 21, and the coupling 22 can individually be supplied with hydraulic pressure, and the hydraulic pressure circuit is not complicated.

Figure 11:
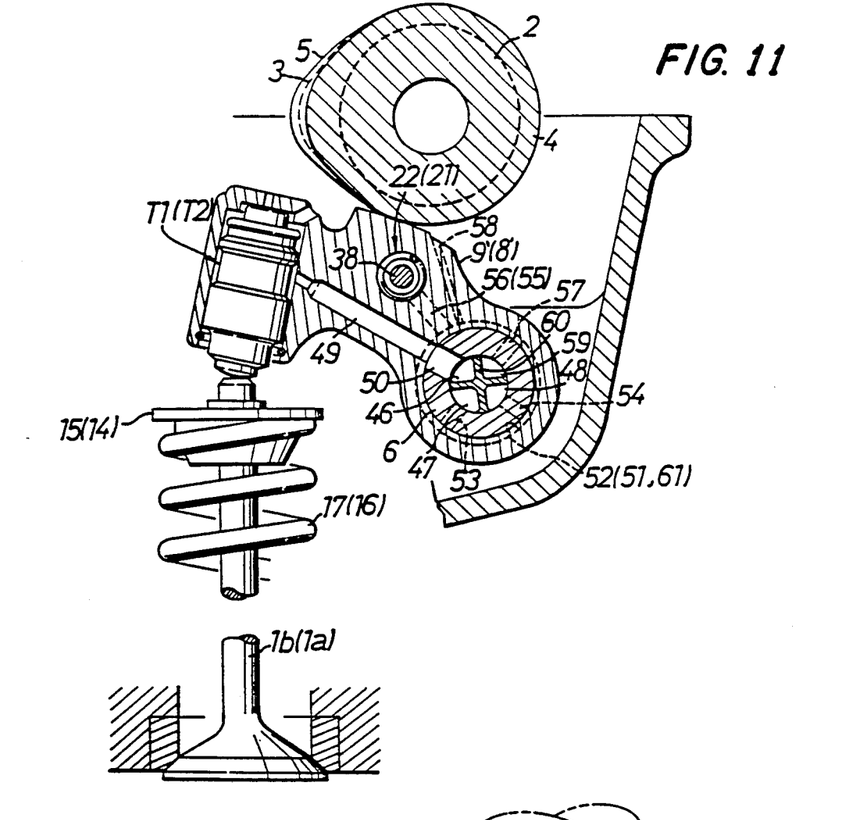
FIG. 11 is a view similar to FIG. 10 illustrating the further incorporation of lubrication means.

FIG. 11 shows a sixth embodiment of the present invention. In this embodiment, the rocker shaft 6 has an axially extending partition 60 of an X-shaped cross section forced or fixedly mounted therein or integrally formed therewith. The partition 60 divides the inner space of the rocker shaft 6 into four parallel hydraulic pressure supply passages, 46, 47, 48, 59. As with the fifth embodiment, the hydraulic pressure supply passages 46, 47, 48 communicate with the respective hydraulic pressure chambers of the hydraulic tappets T1, T2, and with the couplings 21, 22. The hydraulic pressure supply passage 59 communicates with a hydraulic passage 58 for supplying lubricating oil to the cam slippers and a separate hydraulic passage (not shown) for supplying lubricating oil to the cam journals. For this purpose, a hole 57 defined in the rocker shaft 6 is caused to connect annular grooves 61 defined in the respective rocker arms 7, 8', 9' with the hydraulic pressure supply passage 59.

In addition to the advantages of the fifth embodiment, the sixth embodiment has an additional advantage in that lubricating oil can be supplied to the slidingly contacting surfaces of the cams 3, 4, 5, to the rocker arms 7, 8', 9' and also to the cam journals through a simple hydraulic passage arrangement.

Figure 12:
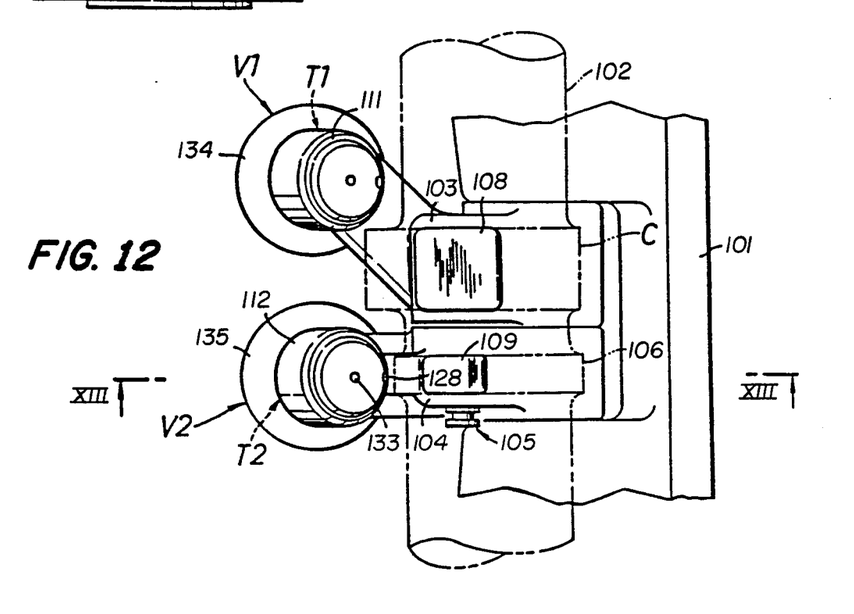
FIG. 12 is a plan view of another embodiment of the present invention.
Figure 13:
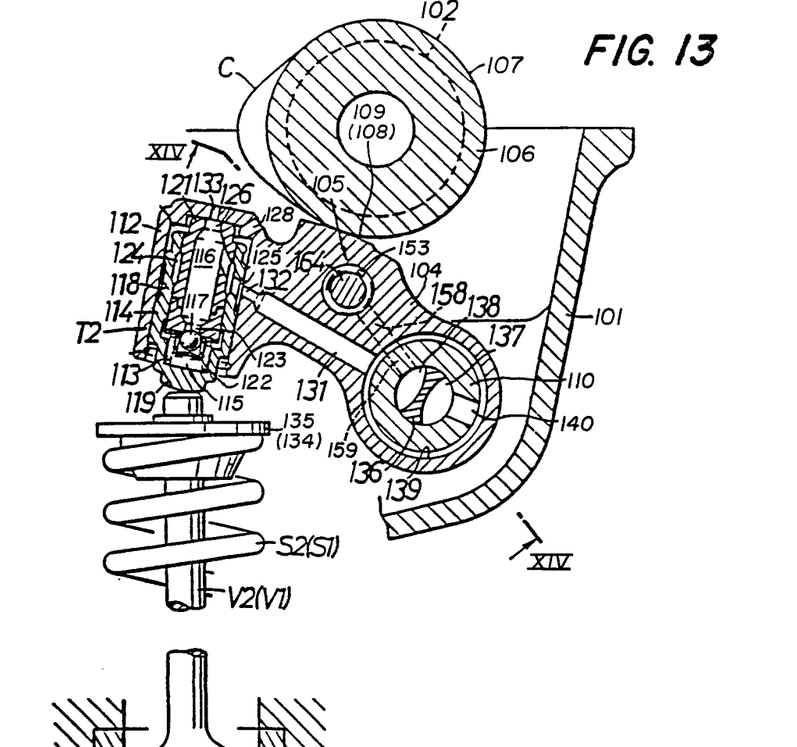
FIG. 13 is a sectional view taken along line XIII—XIII of FIG. 12.

In FIGS. 12 and 13 which show another embodiment of the present invention, a pair of intake valves V1, V2 are disposed in an engine body 101, and can be opened and closed by a cam C integrally formed on a camshaft 102 rotatable in synchronism with rotation of the engine at a speed ratio of ½ with respect to the speed of rotation of the engine, and also by first and second rocker arms 103, 104, angularly movable about an axis parallel to the camshaft 102, and a selectively actuated coupling 105 disposed in the rocker arms 103, 104. The intake valves V1, V2 are operated selectively in a mode in which both are opened and closed, or a mode in which only intake valve V1 is opened and closed. The engine body 101 also has a pair of exhaust valves (not shown) which can be opened and closed in a manner similar to the intake valves V1, V2.

The camshaft 102 is rotatably disposed above the engine body 101. The cam C is integrally formed with the camshaft 102 in alignment with the intake valve V1. The camshaft 102 has an integral concentric surface of the raised portion 106 aligned with the other intake valve V2. The surface of the raised portion 106 is a circle having a radius equal to the radius of the base circle 107 of the cam C. The first rocker arm 103 has an integral cam slipper 108 positioned on its upper surface and held in sliding contact with the cam C, and the second rocker arm 104 has an integral slipper 109 positioned on its upper surface and held in sliding contact with the raised portion 106.

The rocker arms 103, 104 have base portions angularly movably supported on a rocker shaft 110 fixed to the engine body 101 parallel to the camshaft 102, the base portions being in sliding contact with each other.

The rocker arms 103, 104 have on each of their ends housings 111, 112, respectively, for engaging the upper ends of the respective intake valves V1, V2. Hydraulic lash adjusters T1, T2 are disposed in the respective housings 111, 112. The hydraulic lash adjusters T1, T2 are basically of the same construction. Accordingly, the structure of only one of the hydraulic lash adjusters, that indicated as T2, will be described in detail.

The hydraulic lash adjuster T2 has a hydraulic pressure chamber 115 defined in the rear side of a plunger 114 which is normally urged by a spring 113 to move into engagement with the intake valve V2. A check valve in the form of a ball 117 is interposed between the hydraulic pressure chamber 115 and a hydraulic reservoir chamber 116 communicating with a hydraulic supply source (not shown) at all times.

The housing 112 has a bore 118 opening toward the intake valve V2. The plunger 114, which is closed at its lower end, is slidably disposed within the bore 118. The closed lower end of the plunger 114 contains a spherical head 119 directed toward the intake valve V2. A ring 120 is held against the inner surface of the open end of the bore 118 for preventing the plunger 114 from being displaced therefrom.

The hydraulic reservoir chamber 116 is defined by a cylindrical member 121 slidably fitted in the plunger 114. The hydraulic pressure chamber 115 is defined between the lower end of the cylindrical member 121 and the lower end of the plunger 114. A valve cage 122 is disposed in the hydraulic pressure chamber 115 and pressed against the cylindrical member 121 by a spring 113. The spherical check valve 117 is floatingly housed in the valve cage 122. The cylindrical member 121 has a valve hole 123 defined in the lower end thereof and communicating with the hydraulic pressure chamber 115. The communication between the valve hole 123 and the hydraulic pressure chamber 115 can be closed by the check valve 117.

The cylindrical member 121 has an annular groove 124 provided in its outer surface that communicates via a passage 124' with the hydraulic reservoir chamber 116. The plunger 114 has an annular groove 125 defined in its outer surface that communicates with the annular groove 24 via passage 25' irrespective of relative movement of the cylindrical member 21 and the plunger 14. The cylindrical member 21 is biased upwardly by the force of the spring 113 to be pressed against the closed end of the bore 118. The upper end of the cylindrical member 121 has a through-hole 126 communicating with the hydraulic reservoir member chamber 16. The bore 118, the plunger 114, and the cylindrical member 121 cooperate at their upper ends to define an annular chamber 127. A vent hole 128 extending through the second rocker arm 104 vents the annular chamber 127 to atmosphere in order to prevent the plunger 114 from moving due to pressurization and pressure reduction in the annular chamber 127.

The rocker shaft 110 has an axially extending partition 136 forced or fixedly mounted therein, or integrally formed therewith. The partition 136 divides the interior of the rocker shaft 110 into first and second hydraulic pressure supply passages 137, 138. The first and second hydraulic pressure supply passages 137, 138 are individually connected to corresponding hydraulic pressure supply sources (not shown). The first hydraulic pressure supply passage 138 is supplied with a fluid of relatively high hydraulic pressure.

The second rocker arm 104 has an annular groove 139 surrounding the rocker shaft 110. A hole 140 is provided in the rocker shaft 110 through which the first hydraulic pressure supply passage 37 communicates with the annular groove 139. The second rocker arm 104 has a first hydraulic passage 131 interconnecting the annular groove 139 and the annular groove 125 of the plunger 114, the first hydraulic passage 131 having a restriction 132. Thus, the hydraulic reservoir chamber 116 of the hydraulic lash adjuster T2 is held in communication with the first hydraulic pressure supply passage 137 at all times. The restriction 132 serves to limit the rate of supply of the hydraulic medium from the first hydraulic pressure supply passage 137. The housing 112 of the second rocker arm 104 has a restriction 133 in its upper portion communicating with the through-hole 126. This restriction 133 serves to limit the rate of discharge of the hydraulic medium from the hydraulic reservoir chamber 116. The restrictions 132, 133, therefore, prevent the hydraulic pressure in the hydraulic reservoir chamber 116 from being abruptly varied.

Figure 14:
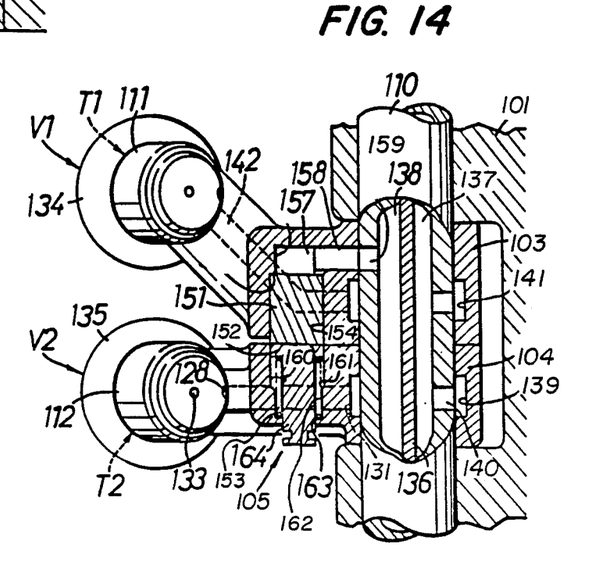
FIG. 14 is a partial sectional view taken along line XIV—XIV of FIG. 13.

As shown in FIG. 14, which is provided with a lash adjuster such as that described above in conneton with the second rocker arm 104, the first rocker arm 103 has an annular groove 141 communicating with the first hydraulic pressure supply passage 137 and a first hydraulic passage 142 connecting the hydraulic lash adjuster T1 and the annular groove 141. The first hydraulic passage 142 has a restriction (not shown) similar to the restriction 132 in passage 131.

Flanges 134, 135 are mounted on the upper portions of the respective intake valves V1, V2. The intake valves V1, V2, are normally urged upwardly in a valve closing direction by valve springs S1, S2 (FIG. 13) disposed between the flanges 134, 135 and the engine body 101 around the intake valves V1, V2, respectively.

The first and second rocker arms 103, 104 are held in lateral sliding contact with each other. A selectively actuated coupling 105 is arranged in the rocker arms 103, 104 for selectively disconnecting the rocker arms for relative angular displacement and interconnecting them for movement in unison.

The coupling 105 includes a piston 151 movable along an axis parallel to the rocker shaft 110 between a position in which it interconnects the first and second rocker arms 103, 104 and a position in which it disconnects the rocker arms from each other. Also provided are a stopper 152 for limiting the movement of the piston 151, and a spring 153 for urging the stopper 152 to move the piston 151 toward the position to disconnect the rocker arms from each other.

The first rocker arm 103 has a first guide hole 154 opening toward the second rocker arm 104 and extending parallel to the rocker shaft 110. The first rocker arm 103 also has a smaller-diameter hole 156 near the closed end of the first guide hole 154, with a step 155 being defined between the smaller-diameter hole 156 and the first guide hole 154. The piston 151 is slidably fitted in the first guide hole 154. The piston 151 and the closed end of the smaller-diameter hole 156 cooperate to define therebetween a hydraulic pressure chamber 157. The first rocker arm 103 also has a second hydraulic passage 158 communicating with the hydraulic pressure supply passage 138 in the rocker shaft 110 by means of a through-hole 159 defined in the side wall of the rocker shaft 110.

The piston 151 has an axial length such that when its inner end abuts against the step 155, the other end thereof does not project from the side of the first rocker arm 103 facing the second rocker arm 104.

The second rocker arm 104 has a second guide hole 160 opening toward the first rocker arm 103 for registration with the first guide hole 154 in the first rocker arm 103, the second guide hole 160 having the same diameter as that of the first guide hole 154. The circular stopper 152 is slidably fitted in the second guide hole 160. The second rocker arm 104 also has a smaller-diameter hole 162 near the closed end of the second guide hole 160, with a step 161 defined between the second guide hole 160 and the smaller-diameter hole 162 for limiting movement of the circular stopper 152. The second rocker arm 104 also has a through-hole 163 defined coaxially with the smaller-diameter hole 162 and smaller in diameter than the hole 162, the hole 163 extending between the bottom of the hole 162 and the outer side of the second rocker arm 104. A guide rod 164, joined integrally and coaxially to the circular stopper 152, extends through the hole 163. The coil spring 153 is disposed around the guide rod 164 between the stopper 152 and the closed end of the smaller-diameter hole 162.

The first and second guide holes 154, 160 are aligned coaxially with each other when the cam slipper 108 of the first rocker arm 103 slidingly contacts the base circle 107 of the cam C and the slipper of the second rocker arm 104 slidingly contacts the circular raised portion 106.

Operation of the above embodiment is as follows. During low-speed operation of the engine, no working oil is supplied to the hydraulic pressure chamber 157 of the coupling 105. The stopper 152 is biased by the spring 153 toward the first rocker arm 103, and the piston 151 abuts against the step 155. Under this condition, the abutting surfaces of the piston 151 and the stopper 152 are aligned with the sliding surfaces of the first and second rocker arms 103, 104. Therefore, the first and second rocker arms 103, 104 are disposed in sliding contact with each other for relative angular displacement, while the piston 151 and the stopper 152 are in sliding contact with each other.

When the first and second rocker arms 103, 104 are thus disconnected by the coupling 105, the first rocker arm 103 is angularly moved by the cam C to cause the intake valve V1 to be opened and closed at the timing and lift according to the cam profile of the cam C. The slipper 109 of the second rocker arm 104 remains in sliding contact with the circular raised portion 106, thereby keeping the other intake valve V2 closed.

For high-speed operation of the engine, working oil under a relatively high pressure is supplied from hydraulic supply passage 38 to the hydraulic pressure chamber 157 of the coupling 105. The piton 151 is thereby moved into the second guide hole 160, while compressing the spring 153 until the stopper 152 abuts against the step 161, whereupon the first and second rocker arms 103, 104 are interconnected by the piston 151. With the first and second rocker arms 103, 104 thus connected to each other, they are angularly moved together as the cam C rotates, thereby opening and closing the intake valves V1, V2 in unison.

When the intake valves V1, V2 are closed at the time the coupling 105 connects the rocker arms 103, 104, the first rocker arm 103 is urged by hydraulic lash adjuster T1 in a direction to bring the cam slipper 103 into sliding contact with the base circle 107 of the cam C, and the second rocker arm 104 is urged by the hydraulic lash adjuster T2 in a direction to bring the slipper 109 into sliding contact with the raised portion 106. Therefore, since the first and second guide holes 154, 160 are axially aligned with each other, the pin 151 can move smoothly for allowing reliable interconnection of the rocker arms by the coupling 105.

By means of the arrangement, the hydraulic lash adjusters T1, T2 are supplied with a relatively low hydraulic pressure, and the coupling 105 is supplied with a relatively high hydraulic pressure. The hydraulic lash adjusters T1, T2 and the coupling 105 can, therefore, each be operated under suitable hydraulic pressures that can differ from one another.

Figure 15:
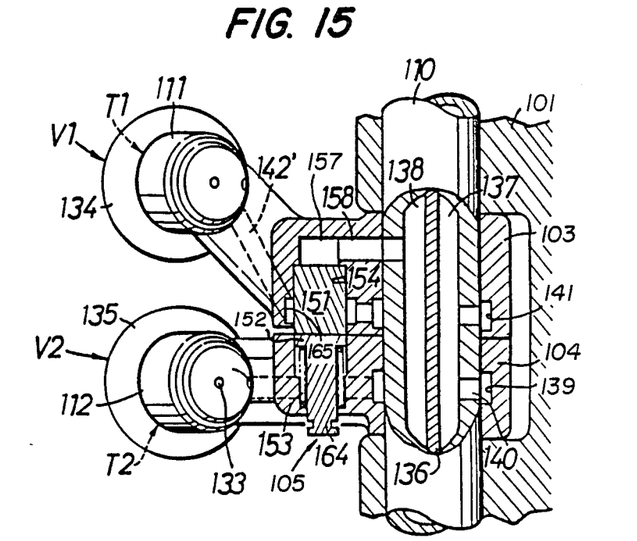
FIG. 15 is a view similar to FIG. 14 illustrating another embodiment of the invention.

FIG. 15 shows another embodiment of the present invention. In this embodiment, the coupling 105 is disposed across a first hydraulic passage 142' by which the hydraulic lash adjuster T1 of the first rocker arm 103 and the first hydraulic pressure supply passage 137 are connected. The first rocker arm 103 has an annular groove 165 which surrounds the piston 151 of the coupling 105 at all times. The first hydraulic passage 142' communicates with the annular groove 165 thereby establishing fluid communication between the passage 142' and the hydraulic supply passage 137 via the hole 140' in the rocker shaft 110 and the groove 151 in the rocker arm 103.

Figure 16:
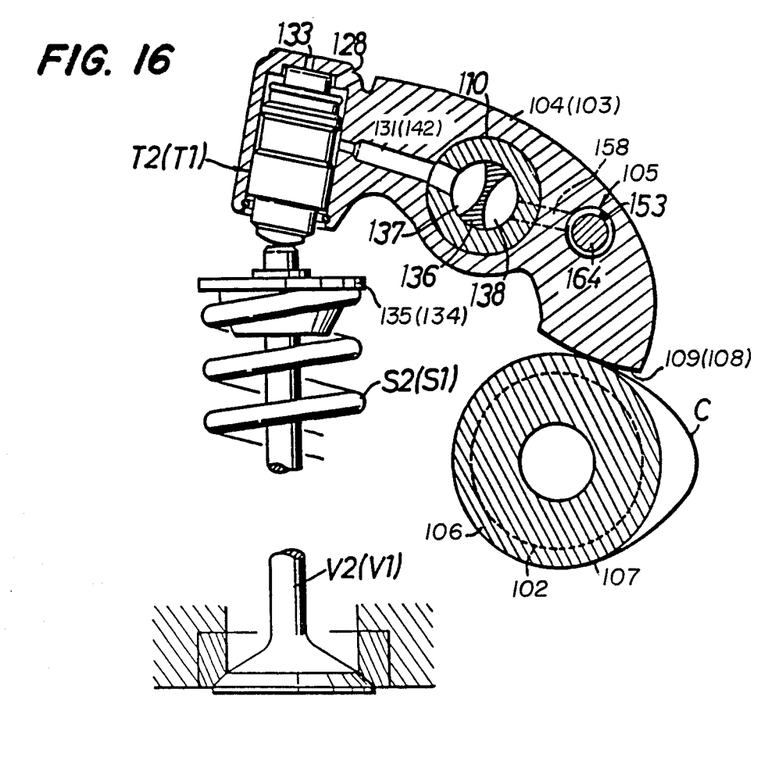
FIGS. 16 and 17 are sectional views similar to FIG. 13 illustrating still further embodiments of the invention.

FIG. 16 illustrates yet another embodiment of the present invention. In this embodiment first and second rocker arms 103, 104 are angularly movably supported at their intermediate portions on the rocker shaft 110. Hydraulic lash adjusters T1, T2 engaging the intake valves V1, V2, respectively, are disposed in ends of the respective rocker arms 103, 104. A cam slipper 108 is defined on the lower portion of the opposite end of the first rocker arm 103 and held in sliding contact with the cam C, and a slipper 9 is similarly defined on the lower portion of the opposite end of the second rocker arm 104 and held in sliding contact with the circular raised portion 106. The selectively actuated coupling 105 is disposed in the rocker arms 103, 104 in a position displaced from the rocker shaft 110 toward the opposite ends of the rocker arms.

The rocker shaft 110 has its second hydraulic pressure supply passage 138 connecting with the coupling 105 and its first hydraulic pressure supply passage 137 connecting with the hydraulic lash adjusters, T1, T1, the first and second hydraulic pressure supply passages, 37, 38, being defined on opposite sides of the partition 136. The second hydraulic pressure passage 138 and the coupling 105 are interconnected by a second hydraulic passage 158, and the hydraulic lash adjusters T1, T2, and the first hydraulic passages 142, 131.

Figure 17:
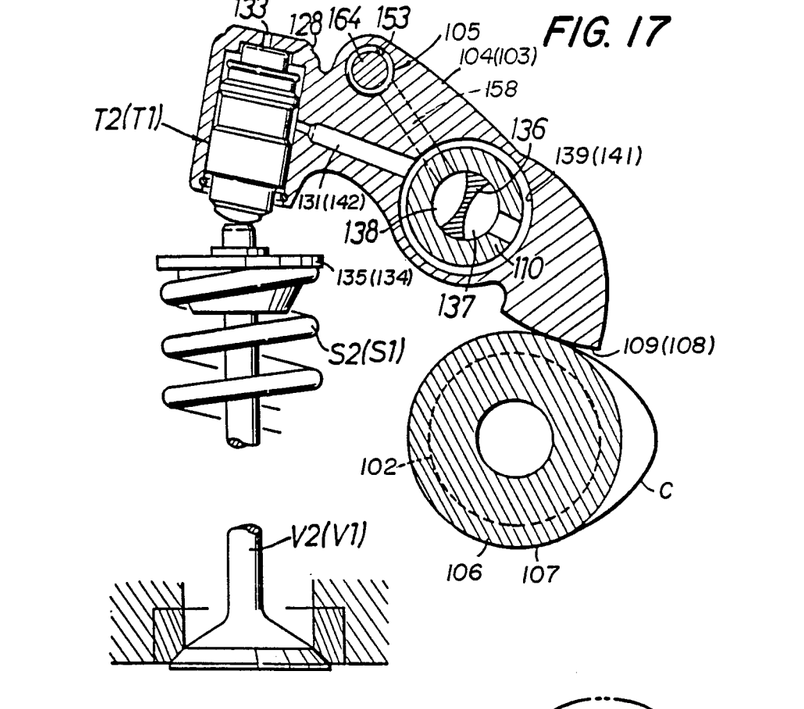

In the embodiment of the invention illustrated in FIG. 17, the coupling 105 is disposed in the first and second rocker arms 103, 104 in a position displaced from the rocker shaft 110 toward the hydraulic lash adjusters T1, T2.

Annular grooves 141, 139 communicating with the first hydraulic pressure supply passage 137 are defined in the first and second rocker arms, 103, 104, respectively, in surrounding relation to the rocker shaft 110. The hydraulic lash adjusters T1, T2, and the annular grooves 141, 139, are connected by the individual first hydraulic passages 142, 131. The coupling 105 is fluidly connected to the second hydraulic pressure supply passage 138 via the second hydraulic passage 158.

Figure 18:
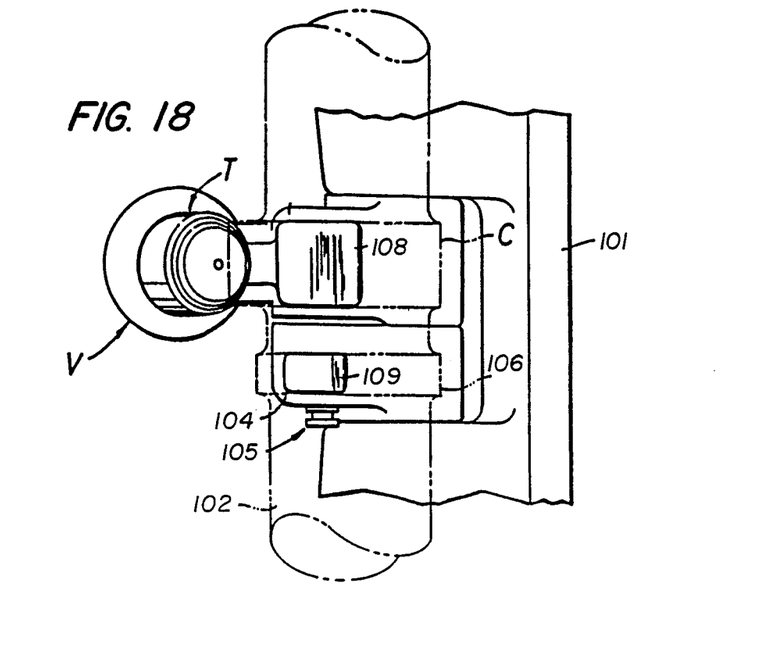
FIG. 18 is a plan view similar to FIG. 12 illustrating yet another embodiment of the invention.

In the embodiment of the invention illustrated in FIG. 18 a hydraulic lash adjuster T is mounted on the rocker arm 103. The rocker arm 103, which is swingably driven by the cam C, is engaged by a single intake valve V. The selectively actuated coupling 105 is disposed between the rocker arm 103 and a separate rocker arm 104 that is held in sliding contact with the circular raised portion 106 on the camshaft 2. The rocker arm 103 has a first hydraulic passage (not shown) leading to the hydraulic lash adjuster T and a second hydraulic passage (not shown) leading to the selective coupling 105.

Figure 19:
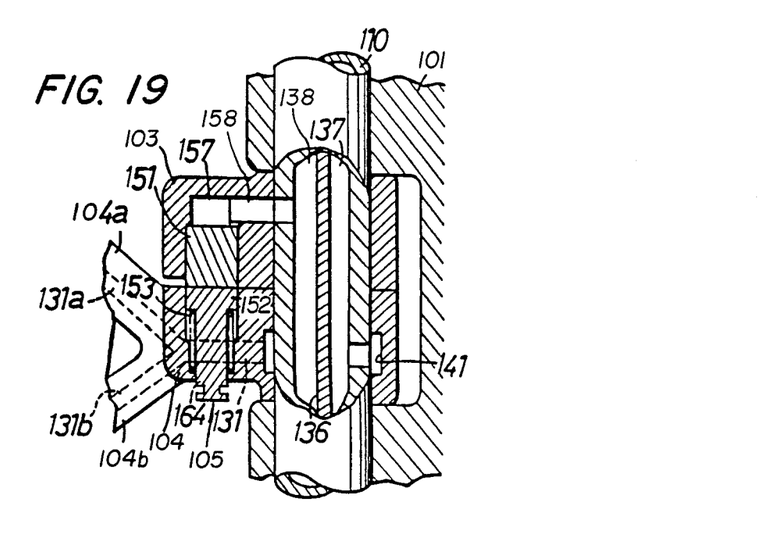
FIGS. 19, 20 and 21 are sectional views similar to FIG. 14, illustrating three additional embodiments of the present invention.

In the embodiment of the invention illustrated in FIG. 19, one of a pair of rocker arms 103, 104, between which a selectively actuated coupling 105 is disposed, e.g., the rocker arm 104, is bifurcated to form two arms 104a, 104b, each of which has hydraulic lash adjusters (not shown) that each engage one of a pair of intake valves (not shown), respectively. The rocker arm 104 has a first hydraulic passage 131 defined therein across the coupling 105, and the arms 104a, 104b have respective second hydraulic passages 131a, 131b, connecting the first hydraulic passage 131 and the respective hydraulic lash adjusters. The other rocker arm 103 has a hydraulic passage 158 leading to the coupling 105.

Figure 20:
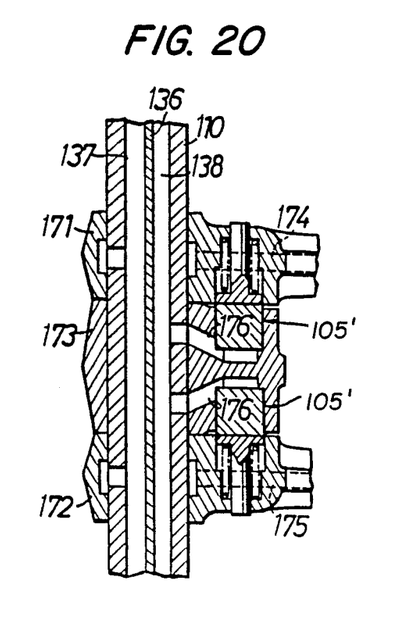

In the embodiment of FIG. 20, hydraulic lash adjusters (not shown) engaging respective intake valves (also not shown) are mounted respectively on rocker arms 171, 172, that are swingable in sliding contact with respective cams (not shown). A rocker arm 173 is disposed between the rocker arms 171, 172 and held in sliding contact with a circular raise portion, similar to the previously described raised portions 106 on the camshaft. Selectively actuated couplings 105' are disposed between the rocker arms 171, 173 and between the rocker arms 172, 173, respectively.

The rocker arms 171, 172 have first hydraulic passages 174, 175, respectively, interconnecting the hydraulic lash adjusters and a first hydraulic pressure supply passage 137. The passages 174, 175, each extend across the couplings 105'. The rocker arms 173 has a pair of second hydraulic passages 176 by means of which the couplings 105' are connected to the second hydraulic pressure supply passage 138.

Figure 21:
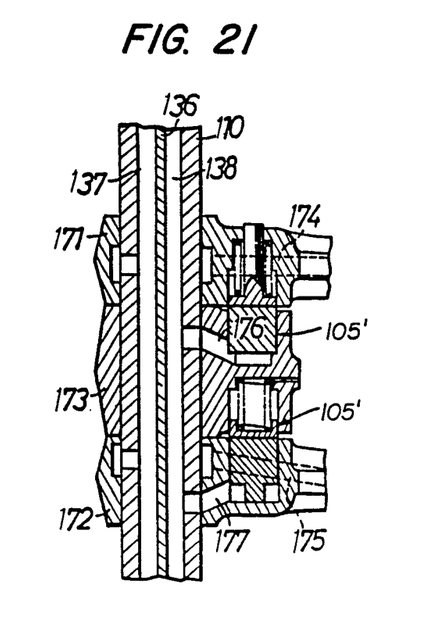

In the embodiment of FIG. 21, the rocker arm 171 has a first hydraulic passage 174; the rocker arm 172 has first and second hydraulic passages 175, 176; and rocker arm 173 has a second hydraulic passage 177.

According to the present invention, therefore, selectively actuated couplings are disposed between mutually adjacent rocker arms for interconnecting and disconnecting them. The couplings are operable independently of each other by receiving operating fluid from separate sources of hydraulic pressure. Therefore, the entire operation range of an engine can be divided into three or more ranges for valve operation control to achieve increased engine output power and fuel economy. Moreover, as shown in the several described embodiments of the invention, first and second hydraulic passages can be provided for any number of valves and any particular arrangement of rocker arms and selectively actuated couplings, which may vary from control mode to control mode. Two second hydraulic passages can independently be provided in order to allow three-mode control.

Since a plurality of hydraulic pressure passages communicating separately with the respective selective couplings are defined by an axially extending partition in the rocker shaft, the hydraulic pressure supply system, even one used in a multicylinder internal combustion engine, can be simplified. Additionally, the number of separate hydraulic pressure passages can be selected so as to additionally provide operating fluid to hydraulic lash adjusters and oil to lubricate the operating parts of the apparatus.

While the present invention has been described with respect to intake valves in the aforesaid embodiments, it will be appreciated that the invention is equally applicable to the operation of exhaust valves. It is also possible to change cylinder cut-off operation and variable valve timing in a plurality of modes with a single intake or exhaust valve, without any limitation on the control modes and the number of valves. Therefore, it should be understood that, although preferred embodiments of the invention have been illustrated and described herein, changes can be made in the described arrangements without departing from the scope of the appended claims.

I claim:

1. For use in an internal combustion engine having a cylinder, intake and exhaust valves operable in said cylinder, selective valve operating means, comprising:
a plurality of pivotally mounted rocker arms, including at least one driver rocker arm having an end operably connecting said valves and a free rocker arm selectively connectable with an adjacent driver rocker arm;
a camshaft rotatably driven by said engine;
a plurality of cams mounted for rotation on said engine, each said cam engaging a follower surface on each said rocker arm;
hydraulically operated, selectively actuable coupling means carried by respective of said rocker arms for selectively connecting or disconnecting adjacent rocker arms;
fluid passages in said rocker arms for supplying operating fluid to said coupling means; and
means for supplying operating fluid independently to each said fluid passage, including:
a rocker shaft having an axial opening mounting said rocker arms for pivotal movement;
partition means in said rocker shaft opening defining a plurality of independent fluid supply lines; and
means for independently connecting respective of said fluid supply lines to respective of said rocker arm passages.

2. The apparatus according to claim 1 including a hydraulic lash adjuster operably connecting each said driver rocker arm to the associated valve; fluid supply passages through said driver rocker arms connecting with said lash adjusters; and means for connecting one said rocker shaft fluid supply line to said rocker arm lash adjuster fluid supply passages.

3. The apparatus according to claim 1 including lubricating fluid supply passages in said rocker arms for conducting lubricating oil to said follower surface thereon; and means for connecting said lubricating fluid supply passages to one of said rocker shaft fluid supply lines.

4. The apparatus according to claim 1 in which said rocker arms include a free rocker arm interposed between a pair of driver rocker arms, said coupling means including independent couplers for selectively connecting said free rocker arm to each adjacent driver rocker arm, and means for independently connecting the fluid passages in said rocker arms between respective of said rocker shaft supply lines and each said coupler.

5. The apparatus according to claim 4 in which said coupling means comprises a pair of couplers oppositely disposed in said free rocker arm for selective connection with an adjacent driver rocker arm.

6. The apparatus according to claim 4 in which said coupling means comprises a coupler in each said driver rocker arm for selective connection with said free rocker arm.

7. The apparatus according to claim 2 in which said rocker arms include a free rocker arm interposed between a pair of driver rocker arms; said coupling means including separate couplers for selectively connecting said free rocker arm to the adjacent driver rocker arm; said rocker arm fluid passage including first passages connecting with said couplers and second passages connecting with said lash adjusters; and means for connecting said first and second passages to respective of said rocker shaft supply lines.

8. The apparatus according to claim 2 including a driver rocker arm having a bifurcate body operably connecting a pair of valves; a lash adjuster on each segment of said body; and said fluid supply passage through said driver rocker arm being coextensive with said segments.

9. The apparatus according to claim 2 in which said rocker shaft is disposed between said rocker arm end and said follower surface; said coupling means being disposed adjacent said follower surface; said coupling means fluid supply passages and said lash adjuster fluid supply passages extending oppositely from said rocker shaft.

10. The apparatus according to claim 1 including a rocker arm having a rocker base fixed to said rocker shaft; an annular groove in said rocker base communicating with said rocker arm passage; and means for communicating said annular groove with one of said rocker shaft fluid supply lines.

11. The apparatus according to claim 10 in which said rocker shaft is disposed between said rocker arm end and said follower surface; said coupling means disposed adjacent said rocker arm end; said coupling means fluid supply passages and said lash adjuster fluid supply passages being arranged to connect one with said rocker shaft and one with said annular groove.

12. The apparatus according to claim 2 in which said coupling means comprises guide holes in adjacent rocker arms having registrable openings; a movable piston carried by one of said guide holes for extension into the opening in the adjacent guide hole; said coupling means fluid supply passage communicating with said one guide hole at the end remote from said opening; an annular groove in the wall of said one guide hole adjacent the opening therein; and said lash adjuster fluid supply passage intersecting said annular groove.

13. The apparatus according to any one of claims 1 to 3 in which said rocker shaft fluid supply lines conduct fluids at different pressures.

14. The apparatus according to any one of claims 1 to 12 in which each of said cams has a cam profile defining a different mode of valve operation and said coupling means being selectively actuable in accordance with a desired mode of valve operation.

15. The apparatus according to claim 14 in which at least one of said cams has a circular profile.

* * * * *